US012740564B2

(12) United States Patent
Riquelme Terres et al.

(10) Patent No.: US 12,740,564 B2
(45) Date of Patent: Sep. 22, 2026

(54) METHOD AND PROCEDURE FOR OBTAINING NATURAL PYRETHRIN MICROBIOCAPSULES WITH HIGH STABILITY

(71) Applicant: TRADE CORPORATION INTERNATIONAL S.A.U., Madrid (ES)

(72) Inventors: Enrique Riquelme Terres, Orihuela (ES); Pablo De Nicolas Carrillo, Orihuela (ES); Noemi Herrero Asensio, Orihuela (ES)

(73) Assignee: TRADE CORPORATION INTERNATIONAL S.A.U., Madrid (ES)

(*) Notice: Subject to any disclaimer, the term of this patent is extended or adjusted under 35 U.S.C. 154(b) by 1199 days.

(21) Appl. No.: 17/611,865

(22) PCT Filed: May 18, 2020

(86) PCT No.: PCT/ES2020/000026
§ 371 (c)(1),
(2) Date: Nov. 16, 2021

(87) PCT Pub. No.: WO2020/234492
PCT Pub. Date: Nov. 26, 2020

(65) Prior Publication Data

US 2022/0225619 A1 Jul. 21, 2022

(30) Foreign Application Priority Data

May 17, 2019 (ES) ............................... ES201930434

(51) Int. Cl.
*A01N 53/00* (2006.01)
*A01N 25/28* (2006.01)
*A01P 7/04* (2006.01)

(52) U.S. Cl.
CPC ............ *A01N 53/00* (2013.01); *A01N 25/28* (2013.01); *A01P 7/04* (2021.08)

(58) Field of Classification Search
CPC ............ A01N 53/00; A01N 25/28; A01P 7/04
See application file for complete search history.

(56) References Cited

U.S. PATENT DOCUMENTS

| | | | | |
|---|---|---|---|---|
| 4,617,318 A | 10/1986 | Marei | | |
| 8,137,715 B2* | 3/2012 | Shah | A01N 53/00 | 424/776 |
| 9,743,676 B2* | 8/2017 | O'Connor | A01N 53/00 | |
| 2007/0104750 A1* | 5/2007 | Wilson | A01N 53/00 | 424/93.46 |
| 2017/0105418 A1* | 4/2017 | Yan | A01N 43/653 | |

FOREIGN PATENT DOCUMENTS

| | | | |
|---|---|---|---|
| CN | 103004858 | A | 4/2013 |
| CN | 106508895 | A | 3/2017 |
| EP | 0567368 | A1 | 4/1993 |
| ES | 8506420 | A1 | 8/1985 |
| ES | 2144618 | T3 | 6/2000 |
| GB | 2058569 | A | 4/1981 |

OTHER PUBLICATIONS

International Search Report issued Nov. 26, 2020 for international patent application No. PCT/ES2020/000026 (5 pages).

* cited by examiner

*Primary Examiner* — Michael P Cohen
(74) *Attorney, Agent, or Firm* — Casimir Jones, S.C.; Peter J. Schlueter

(57) ABSTRACT

The present invention describes a procedure for obtaining microbiocapsules of one or more pyrethrins as active substance, and is framed in the field of biopesticide production technique. Natural pyrethrin is a broad spectrum insecticide extracted from the flowers of the plant of the genus *Chrysanthemum* and is easily decomposed by air and light. The present invention increases the stability of pyrethrins, being effective for a longer time than other solutions of the state of the art. The method and procedure comprises the following steps; a first oil phase, a second phase of mixture emulsion and a third encapsulation phase. The result is the obtaining of pyrethrin microbiocapsules with a size between 0.5 to 5 microns, with greater stability. The process does not reduce the insecticidal capacity of pyrethrins.

15 Claims, 2 Drawing Sheets

Pyrethrin microbiocapsules

Pyrethrin microbiocapsules

METHOD AND PROCEDURE FOR OBTAINING NATURAL PYRETHRIN MICROBIOCAPSULES WITH HIGH STABILITY

TECHNICAL SECTOR

The invention belongs to the field of application of the chemical industry sector dedicated to the production of nanobiopesticides, and specifically to methods for the production of pyrethrin nanoemulsions.

BACKGROUND OF THE INVENTION

With the development of society and the expansion of agricultural areas, there has been a demand for new, more efficient and safe pesticides. Some highly efficient chemical formulations have emerged rapidly, but a high degree of residues appear on analyzing crops. However, with the development of environmental awareness and certification along with advances in biotechnology in recent years, pesticide manufacturers have begun to adhere to safety, efficiency, circular economy and user-friendly guidelines, which have resulted in non-toxic, ecological and zero residue products. Biopesticides have become the priority line of the agrochemical industry.

The use of natural pyrethrins as a pesticide has a long history and can be used to control pests that affect both humans and crops. Natural pyrethrin is an insecticide extracted from the pyretheum flower (*Chrysanthemum cinerariaefolium*) and is easily degradable by light, air, water and microorganisms. Pyrethrin is highly toxic to crop-damaging insects, but is safe for warm blooded animals, is non-polluting, and leaves no residue.

For the prevention and control of pests, pyrethrins are usually in the form of solids, oils, wettable powders and emulsifiable concentrations. In the case of pyretheum oil and concentrated emulsions, it is usually mixed with substances and plant derivatives, which are pollutants for water and the environment. The encapsulation of pyrethrins not only allows the need for lower doses of pyrethrin but also protects the environment, reduces production costs, increases the effectiveness of the insecticide in contact with other supplies or other pesticides and blocks the unpleasant odor of the active substances. Pesticide compositions containing a pyrethroid, a vegetable oil, a solvent and an emulsifying surfactant system are known (EP 567,368). Likewise, emulsifiable concentrates containing a pyrethroid, an excipient that can contain vegetable oils, a surfactant system and optionally solvents and stabilizing agents are known (GB 2,058,569). Compositions containing a pyrethroid, a vegetable oil and a surfactant system consisting, for example, of a mixture of non-ionic and anionic surfactants (U.S. 4,617,3318) are also known, such as compositions containing pyrethroids, vegetable oils or other esters such as an organic solvent (ES 2,144,618). However, none of these documents claims, mentions or can be subtracted from the description, the pyrethroid microencapsulation.

With regard to the procedure for obtaining microcapsules, microencapsulation technologies have been applied to pesticide formulation processes from the early 1970s to the present day. However, the number of products with microencapsulated active substances is quite limited. In 1976 in the United States, Pennwalt launched the first microencapsulated pesticide: Methyl parathion, which significantly reduced the toxicity of the product and prolonged its effects. Pennwalt also encapsulated Pyrethrin ES 8506420 from Pennwalt Corporation by a complex and expensive procedure. Since then, different investigations have been carried out in the field of microcapsule development, and in particular in the field of agriculture, reaching today where there are over 200 agrochemical companies that have research projects in the development and application of microcapsules. Therefore, there is more than 40 years of history in the development of pesticide microcapsules, but compared to developments in the pharmaceutical industry this has been quite slow. As a result, there is little variety of products on the market based on pesticide microcapsules.

Current pesticide microencapsulation methods mainly include: polymerization, cohesive separation phases and solvent evaporation. These methods are not only complicated but also expensive. Organic solvents are also used in large amounts which are polluting.

Despite all these existing alternatives, the need remains to provide a process for obtaining pyrethrin microbiocapsules that does not affect the insecticidal capacity in such a way that they can be used for pest control.

Current pesticide microencapsulation methods mainly include: polymerization, cohesive separation phases and solvent evaporation. These methods are not only complicated but also expensive. Organic solvents are also used in large amounts which are polluting. Despite all these existing alternatives, the need remains to provide a procedure for obtaining pyrethrin microbiocapsules that does not affect the insecticidal capacity in such a way that they can be used for pest control.

EXPLANATION OF THE INVENTION

The present invention has been designed in such a way as to provide, according to a first aspect thereof, a procedure for obtaining microbiocapsules of one or more pyrethrins as active substance, the process of which comprises three steps:

1. Preparation of oil phase, which consists of a dissolution of one or more pyrethrin(s) as active substance with a concentration between 48%-80%, in one or more vegetable oil(s) in a ratio of 1:20, optionally stirring is carried out, optionally a solvent agent can be added that can be fatty acid(s), alcohol(s), essential oil(s) or a mixture thereof, then stirring is applied to the mixture.
2. Emulsifying phase in which an emulsifier and optionally a stabilizing agent and/or a preservative are added, while stirring. Additionally, a co-formulating agent(s) with antioxidant property(ies), preservative(s) and/or anti-foaming agent(s) can be added.
3. Phase of obtaining microbiocapsules, wherein by means of a mixing process, preferably using a mixer, such as a mixer with a paddle stirrer, the result is the obtaining of pyrethrin microbiocapsules at 4-25% w/v, preferably between 4-8% w/v with a size between 0.5 to 5 microns, with greater stability.

In the present invention, pyrethrin microbiocapsule refers to; micrometric particles with an outer membrane inside which it contains pyrethrin as an active substance.

In phase (1), one or more vegetable oil(s) are added that are selected from the group consisting of sunflower, corn, soybean, avocado, jojoba, pumpkin, grape seed, sesame, hazelnut oils, glycerol tricaprocaprylate, or the vegetable oils of the formula R9 COOR10 in which R9 represents the moiety of a higher fatty acid comprising 7 to 29 carbon atoms and R10 represents a straight or branched hydrocarbon chain containing 3 to 30 carbon atoms in particular alkyl or alkenyl, undecylenic, myristoleic, palmitoleic, oleic, linoleic, linolenic, ricinoleic, eicosenoic or docosenoic acids (found in pine, corn, sunflower, soy, raisin seeds, flax or jojoba). As preferred examples of fatty acids, mention may be made of fatty acids comprising unsaturated molecules, for example of the oleic type, which is oligomerized by a double bond condensation reaction. This reaction results in mixtures that essentially comprise dimers and trimers. By dimers and trimers of fatty acids we mean the oligomers of 2 or 3 identical or different monomers. Advantageously, these fatty acids, saturated or unsaturated, comprise 12 to 100 carbon atoms, and more advantageously 24 to 90.

In phase (1) stirring is between 60-150 RPM

In phase (1) the temperature is 20 to 40° C., preferably between 25-35° C.

In phase (1), a solvent agent selected from the unsaturated fatty acids and their derivatives can be added: linoleic acid, linolic acid, oleic acid, folic acid and their derivatives, ubiquinone and ubiquinol and their derivatives, tocopherols and derivatives.

In phase (1) a solvent agent can be added which is selected from lower alcohols such as ethanol and isopropanol; polyhydric alcohols such as glycerol, propylene glycol, dipropylene glycol, and sorbitol;

In phase (1) a dissolving agent can be added which is selected from natural or synthetic essential oils such as, for example, the oils of eucalyptus, hybrid of lavender, lavender, vetiver, *Litsea cubeba*, lemon, sandalwood, rosemary, chamomile, savory, nutmeg, cinnamon, hyssop, caraway, orange, geranium, juniper and bergamot.

In phase (2) a nonionic emulsifying agent is added which appears in a proportion of 10 to 50% of the composition by weight, and preferably, between 15 to 30% by weight with respect to the total weight of the composition.

Nonionic emulsifying agent is understood to mean amphoteric, anionic, preferably cationic. Amphoteric or ampholytic emulsifying agents are understood to be those surfactant compounds that contain, in addition to an alkyl or acyl group with 8 to 18 carbon atoms, at least one free amino group, and at least one —COOH or —SO3H group in the molecule, and are suitable for the formation of internal salts. Examples of suitable ampholytic surfactants are N-alkylglycines, N-alkylpropionic acids, N-alkylaminobutyric acids, N-alkyliminodi-propionic acids, N-hydroxyethyl-N-alkylamidopropylglycines, N-alkyltaurines, N-alkylsarcosines, 2-alkylaminopropionic acids and alkylaminoacetic acids, in each case with about 8 to 18 carbon atoms in the alkyl group. Anionic emulsifying agent is understood to be those having a negative charge, examples of anionic surfactants are, such as alkyl sulfates with a chain length of 8 to 18 C atoms, alkyl or alkylaryl ether sulfates with 8 to 18 C atoms in the hydrophobic moiety and up to 40 ethylene oxide or propylene oxide units, alkyl or alkylaryl sulfonates with 8 to 18 carbon atoms, esters and half esters of sulfosuccinic acid with monovalent alcohols or alkylphenols, alkyl or alkylaryl sulfonates, hydroxylalkanol sulfates, fatty acids of saturated and unsaturated chain of 8 to 24 carbon atoms and their oxy-alkylenated esters and sulfates and phosphates of polyethoxylated alkanols. Cationic emulsifying agents are understood to be those that contain a positive charge in aqueous solution, amines and also quaternary compounds. Examples of cationic emulsifying agents are alkylamines with 7 to 25 carbon atoms, N, N-dimethyl-N-(hydroxyalkyl) ammonium salts with 7 to 25 carbon atoms, mono- and di- (with 7 to 25 carbon atoms)-alkyldimethylammonium quaternized with alkylating agents, the ester quats such as the esterified, quaternary mono-, di- or trialkanolamines, which are esterified with carboxylic acids with 8 to 22 carbon atoms, the imidazolin quats such as the 1-alkylimidazolinium salts of general formulas I or II.

In phase (2) the cationic emulsifying agent used is a quaternary compound, it is observed that it increases the insecticidal capacity of the product resulting from the described procedure.

In phase (2), optionally, a second emulsifying agent can be added, when using combinations of emulsifying agents, it is advantageous to use a relatively hydrophobic emulsifying agent in combination with a relatively hydrophilic agent, or to use an anionic emulsifying agent in combination with a non-ionic agent.

In phase (2), a second emulsifying agent can be added that is present in the composition, generally, in a proportion that can range from 10 to 50% by weight and preferably 15 to 30% by weight with respect to the total weight of the composition.

In phase (2), additionally, co-formulating agent(s) can be added that can be selected from antioxidants such as tocopherol and propyl gallate, nitroxides, BHT-butylhydroxytoluene, BHA-butylhydroxyanisole, and/or acidulants such as; citric acid, lactic acid and malic acid, hydrochloric acid, tartaric acid, phosphoric acid, lactic acid, sulfonic acid, and/or anti-foaming agents; at least one silicone-based or fluorine-based fatty acid containing 14-24 carbon atoms.

In phase (2) the temperature is between 10-45° C., preferably between 25-35° C.

In phase (3) a stirring of 60-300 RPM is carried out between 1 to 36 hours, preferably between 1 to 4 hours. It has been worked under controlled conditions of density between 0.910-0.980 g/cm$^3$ and pH between 5-10, preferably between 6.5-8.5. The final result of the described procedure is the obtaining of pyrethrin microbiocapsules of a size between 0.5-5 μm with a regular morphology and a smooth surface.

In another aspect, the present invention relates to the use of the microbiocapsules of the present invention as an insecticide. More particularly, the present invention relates to the use of the microcapsules of the present invention for the control of arthropod pests such as insects, preferably aphids and ants. The effectiveness of the insecticidal product obtained by this procedure lasts up to 2 years.

BRIEF DESCRIPTION OF THE DRAWINGS

To complement the description that is being made and in order to help a better understanding of the features of the invention, a set of drawings is attached as an integral part of said description, wherein with an illustrative and non-limiting nature, the following has been represented.

1. Length 5.14 μm
2. Length 4.42 μm
3. Length 5.48 μm
4. Length 5.14 μm

PREFERRED EMBODIMENT OF THE INVENTION

The invention will be illustrated below by means of tests carried out by the inventors, which show the effectiveness of the procedure of the invention:

Example 1

Figure 2:
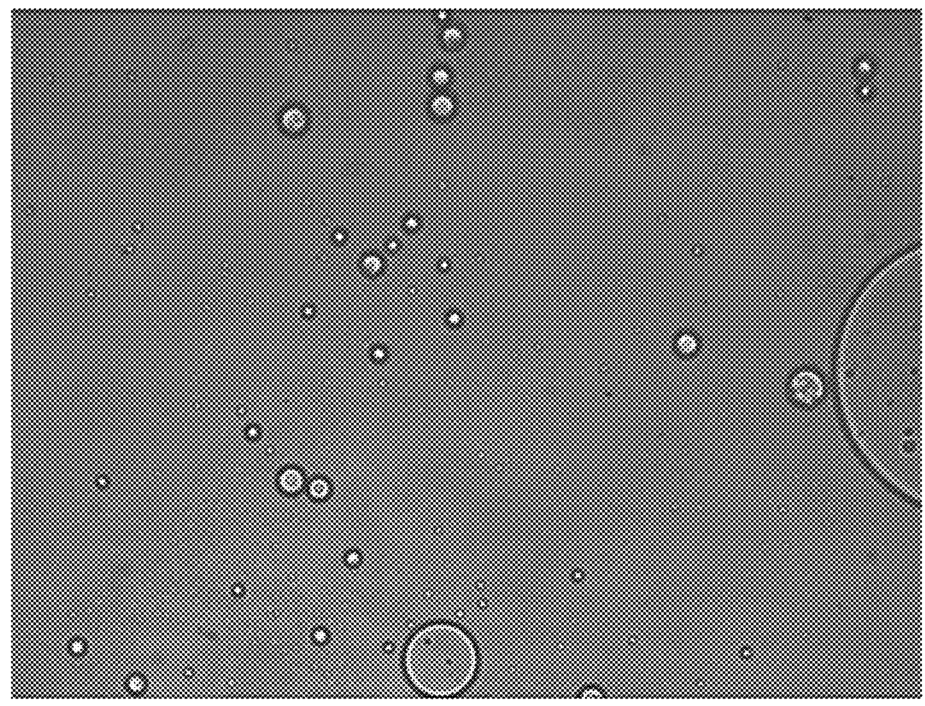
FIG. 2—Shows a photograph of pyrethrin microbiocapsules wherein an epifluorescence microscope (Axioplan, ZEISS) is observed. A sample drop is placed on a slide (20×40×0.25 mm) with a 20× objective.
Figure 3:
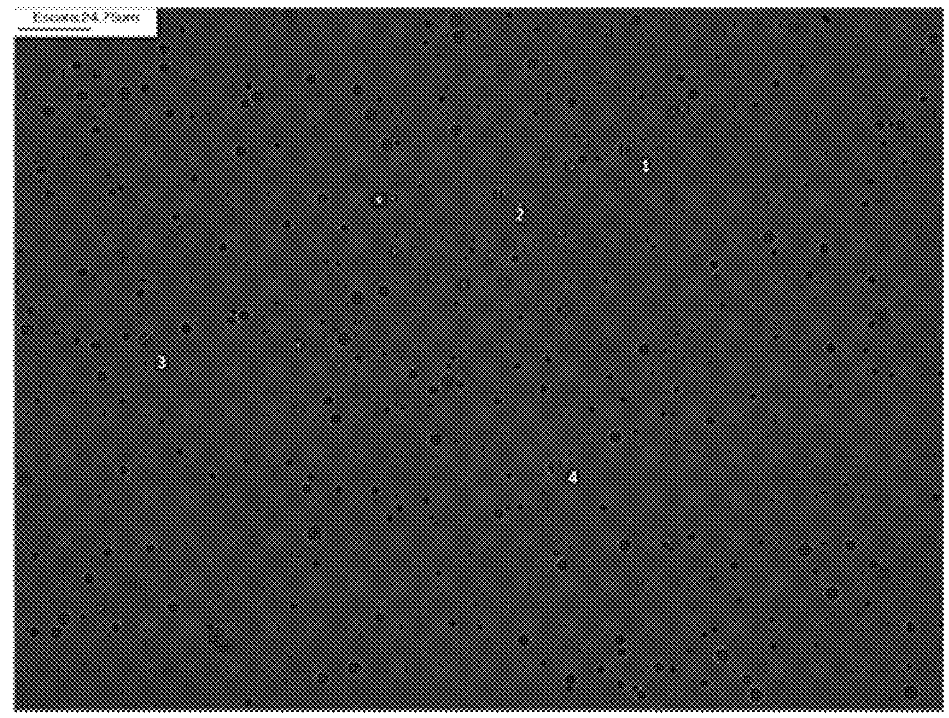
FIG. 3—Shows a photograph of pyrethrin microbiocapsules wherein their size and monodispersity are indicated.

73 g of a refined extract of *Chrysanthemum* EDEOIL P60® were mixed as a source of pyrethrins 60% (w/w); Pyrethrin I, Cinerin I, Jasmoline I, Pyrethrin II, Cinerin II and Jasmoline II, the ratio between Pyrethrin I and Pyrethrin II was 1.85, with 557 g of soybean oil with 50% linoleic acid and 25% in oleic acid, also containing lauric, myristic, palmitic, stearic and linolenic acid, stirring was carried out at 60 rpm in HI 180x-2® at a temperature of 25° C. and 1 g of extract rich in tocopherol E306 was added, stirring was continued for 20 minutes, then without stopping stirring, 158 g of 99.5% propylene glycol and 185 g of 97% polysorbate 80 Sorbilene® were added. Then 15 g of D-limonene of 94% concentration (bitter orange) and 8 g of vegetable glycerin E-422 were added, acting as a co-formulating agent, improving the tense activity of the formulation. It was stirred at 120 rpm for about 2 hours and the appearance of the microbiocapsules was observed (FIG. 2), then the microcapsules and their shapes were measured according to (FIG. 3).

Example 2

Figure 1:
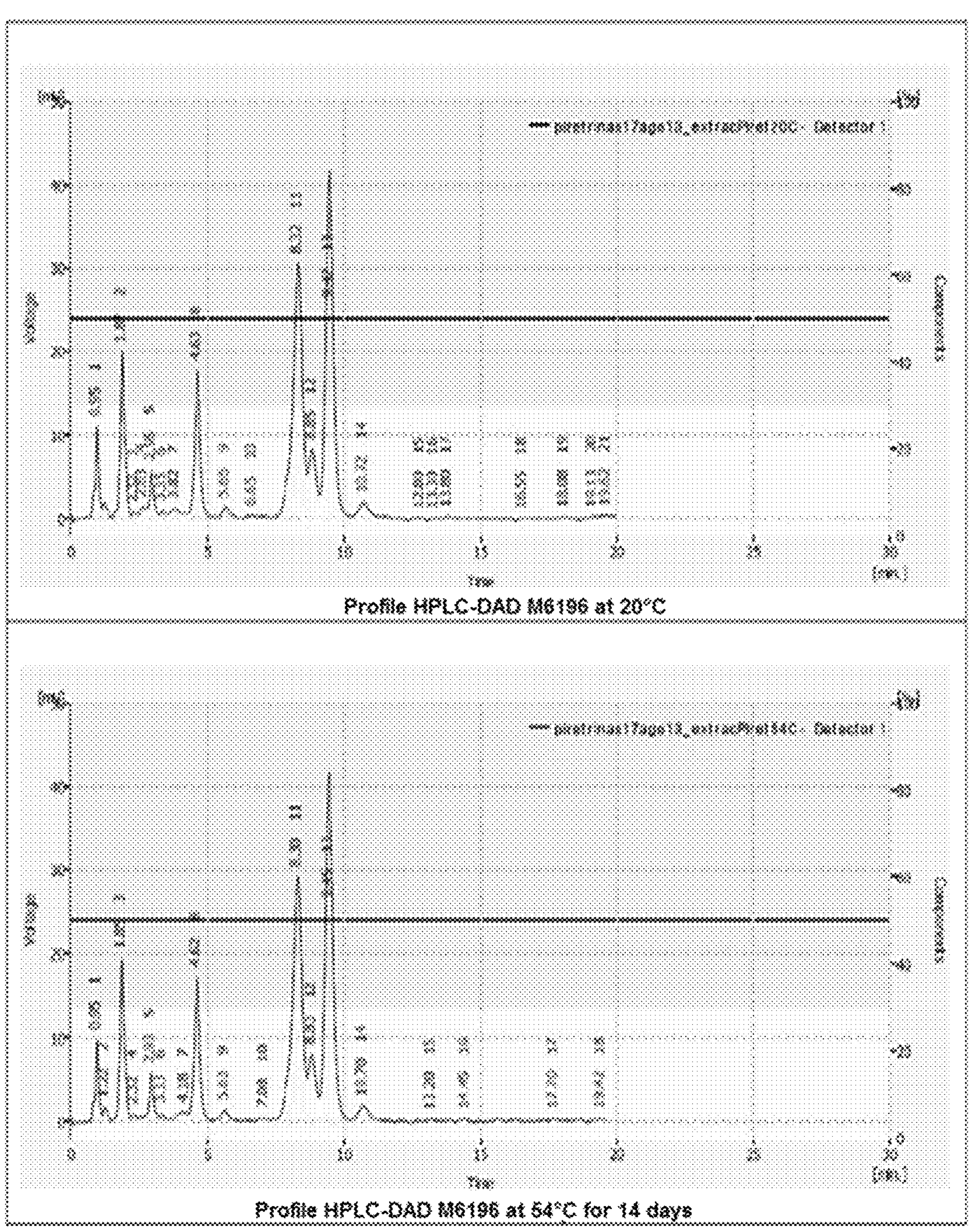
FIG. 1—Shows a chromatographic profile of the resulting composition under normal conditions and 14 days later in the same compound applying the MT 46.3 method.

To determine the stability of the product, obtained by the process of the present invention as described in example 1, the method MT 46.3 (J. Zhang et al. J. of Chromatography A. 1218 (2011) 6621-6629 Dean was used Ban et al. Afr. J. of Biotechnology Vol. 9 (18), pp. 2702-2708, May 3, 2010) by means of heat stimulation to age the formulations and simulate the packaged and stored product (FIG. 1). Formulations that passed the test were considered viable for at least 2 years.

TABLE I

| Storage stability at 54° C. | | | |
|---|---|---|---|
| Assay | 0 day | 7 days | 14 days |
| Physical status (Method EPA OPPTS 830.6303) | Homogeneous liquid | Homogeneous liquid | Homogeneous liquid |
| Color (Method EPA OPPTS 830.6302) | Transparent yellow | Transparent yellow | Transparent yellow |
| Odor (Method EPA OPPTS 830.6304) | Typical | Typical | Typical |
| pH 1/100 (20° C.) (Method CIPAC MT 75.3) | 4.66 | 4.61 | 4.57 |
| Density (25° C.) (Method EPA OPPTS 830.7300) | 1.0390 g/ml | 1.0392 g/ml | 1.0386 g/ml |
| Acidity (% H2SO4) (Method CIPAC MT 191) | 0.063 | 0.065 | 0.068 |
| Wettability (Method CIPAC MT 53.3) | <10 sec. | <10 sec. | <10 sec. |
| Suspensibility (Method CIPAC MT 184) | 96.8 | 96.2 | 95.8 |
| Foam persistence (ml in 1 minute) | <2 ml | <2 ml | <2 ml |

TABLE I-continued

| Storage stability at 54° C. | | | |
|---|---|---|---|
| Assay | 0 day | 7 days | 14 days |
| (Method CIPAC MT 47) | | | |
| Chemical composition: pyrethrins (Method HPLC-DAD) | 4.48% w/v | 4.48% w/v | 4.48% w/v |

The invention claimed is:

1. A procedure for obtaining pyrethrin microbiocapsules comprising:

(1) preparing an oily phase by adding a solution of one or more pyrethrins as an active substance with a concentration about 48% to about 80% w/w to one or more vegetable oils in a ratio of 1:20 of the one or more pyrethrins to the vegetables oils;

(2) preparing an emulsified phase by adding an emulsifying agent to the oily phase of (1), wherein the emulsifying agent is present in a proportion of 10% to 50% by weight; and (3) subjecting the preparation of (2) to a controlled mixing process comprising stirring at about 60 to about 300 RPM for about 1 hour to about 36 hours at a pH of about 5 to about 10 to obtain a preparation of pyrethrin microbiocapsules having a size of about 0.5 μm to about 5 μm.

2. The procedure for obtaining pyrethrin microbiocapsules according to claim 1, characterized in that in phase (1), the vegetable oils are selected from the group consisting of sunflower, corn, soy, avocado, jojoba, pumpkin, grape seed, sesame, hazelnut, or the vegetable oils of the formula $R_9COOR_{10}$ in which $R_9$ represents the moiety of a higher fatty acid comprising 7 to 29 carbon atoms and $R_{10}$ represents a straight or branched hydrocarbon chain containing from 3 to 30 carbon atoms.

3. The procedure for obtaining pyrethrin microbiocapsules according to claim 1, characterized in that the oily phase (1) is stirred at about 60 to about 150 RPM.

4. The procedure for obtaining pyrethrin microbiocapsules according to claim 1, characterized in that the oily phase (1) is at a temperature of about 20° C. to about 40° C.

5. The procedure for obtaining pyrethrin microbiocapsules according to claim 1, characterized in that phase (1) further comprises a solvent agent selected from the group consisting of linoleic acid, linolic acid, oleic acid, folic acid, ubiquinone, ubiquinol and tocopherols.

6. The procedure for obtaining pyrethrin microbiocapsules according to claim 1, characterized in that the oily phase (1) further comprises a solvent agent from the lower alcohols family selected from the group of ethanol, isopropanol, polyhydric alcohols, glycerol, propylene glycol, dipropylene glycol, and sorbitol.

7. The procedure for obtaining pyrethrin microbiocapsules according to claim 1, characterized in that the oily phase (1) further comprises a solvent agent selected from the group of oils of eucalyptus, hybrid of lavender, lavender, vetiver, *Litsea cubeba*, lemon, sandalwood, rosemary, chamomile, savory, nutmeg, cinnamon, hyssop, caraway, orange, geranium, juniper and bergamot.

8. The procedure for obtaining pyrethrin microbiocapsules according to claim 1, characterized in that the oily phase (1) further comprises a solvent agent that is a mixture of solvents of claims 5, 6, or 7, wherein the mixture of solvent agents comprises: tocopherols, glycerol, propylene glycol, and orange oil.

9. The procedure for obtaining pyrethrin microbiocapsules according to claim 1, characterized in that a non-ionic emulsifying agent is added to the emulsified phase (2) in a proportion of about 10% to about 50% by weight, and wherein the non-ionic emulsifying agent is amphoteric or ampholytic.

10. The procedure for obtaining pyrethrin microbiocapsules according to claim 9, wherein a hydrophobic emulsifying agent is added in combination with a hydrophilic agent, and wherein the hydrophobic emulsifying agent is added in a proportion of about 10% to about 50% by weight.

11. The procedure for obtaining pyrethrin microbiocapsules according to claim 9, further comprising adding a co-formulating agent, wherein the co-formulating agent is selected from the group of an antioxidant, an acidulant, and an anti-foaming agent.

12. The procedure for obtaining pyrethrin microbiocapsules according to claim 1, characterized in that the emulsified phase (2) is at a temperature of about 10° C. to about 45° C.

13. The procedure for obtaining pyrethrin microbiocapsules according to claim 1, characterized in that the preparation of pyrethrin microbiocapsules are at a density of about 0.910 g/cm$^3$ to about 0.980 g/cm$^3$.

14. A method of controlling pests comprising applying the pyrethrin microbiocapsules of claim 1 to the pests.

15. The method according to claim 14, wherein the emulsifier added in phase (2) is a cationic emulsifying agent that increases the insecticidal capacity.

* * * * *